Patented July 28, 1953

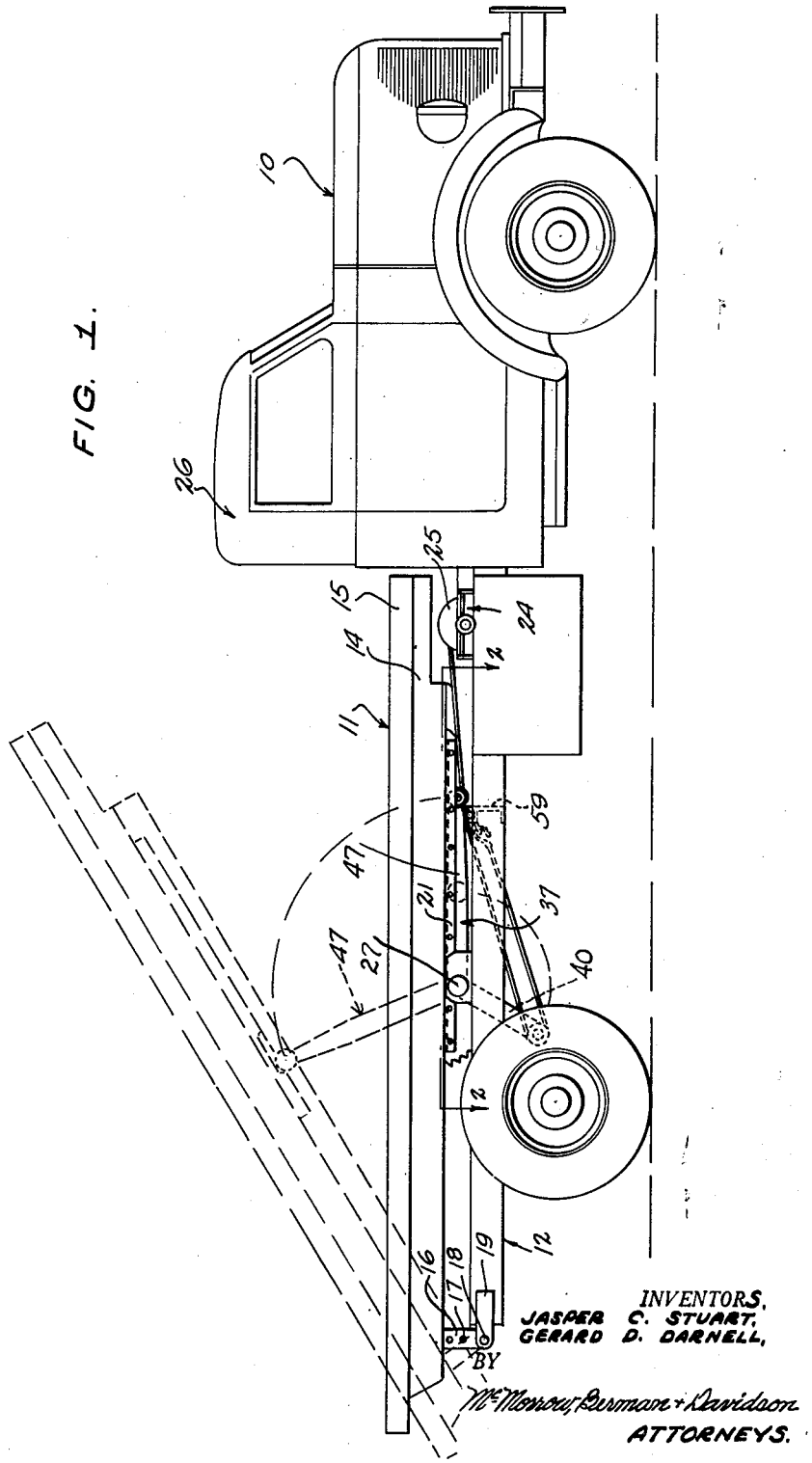

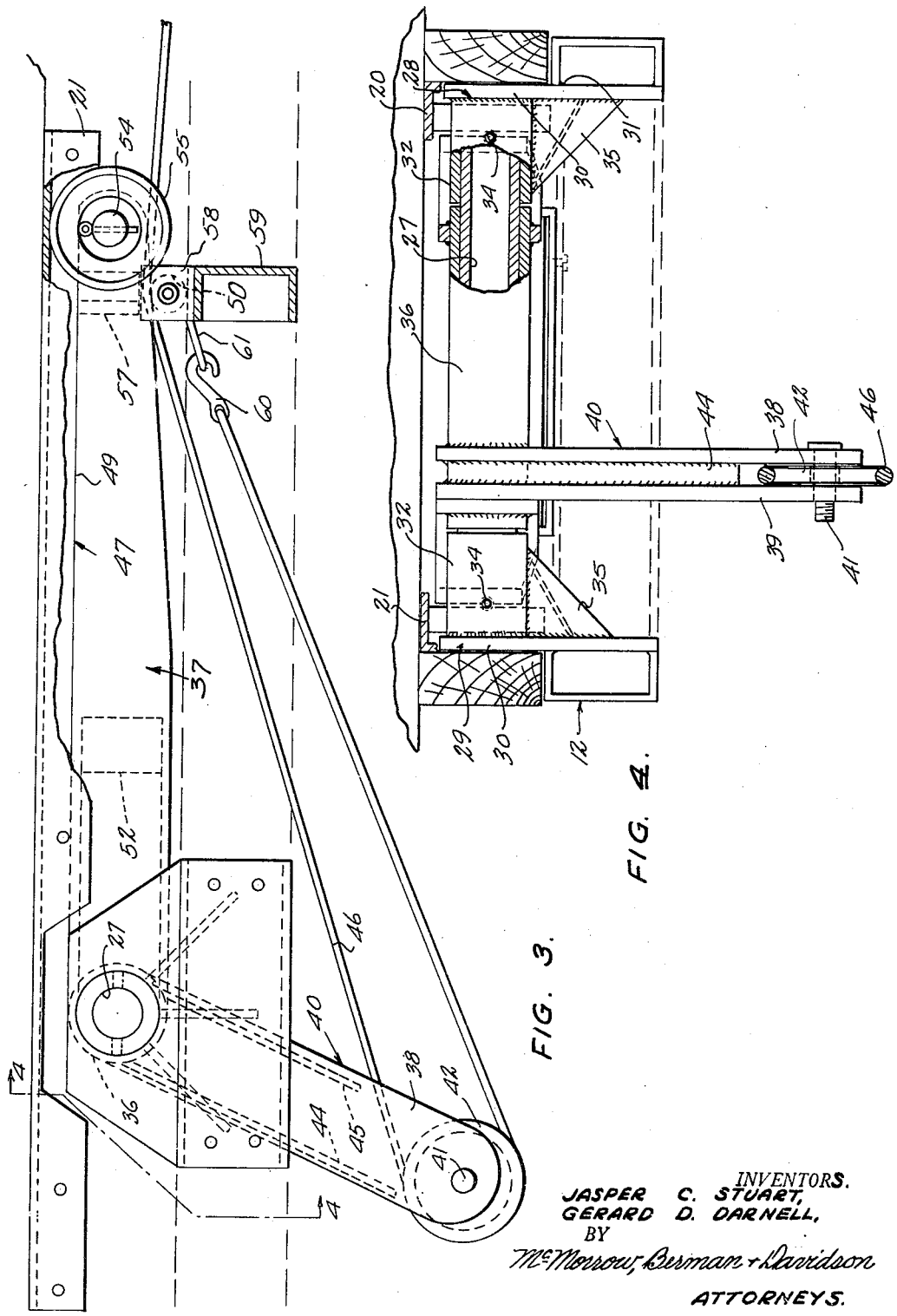

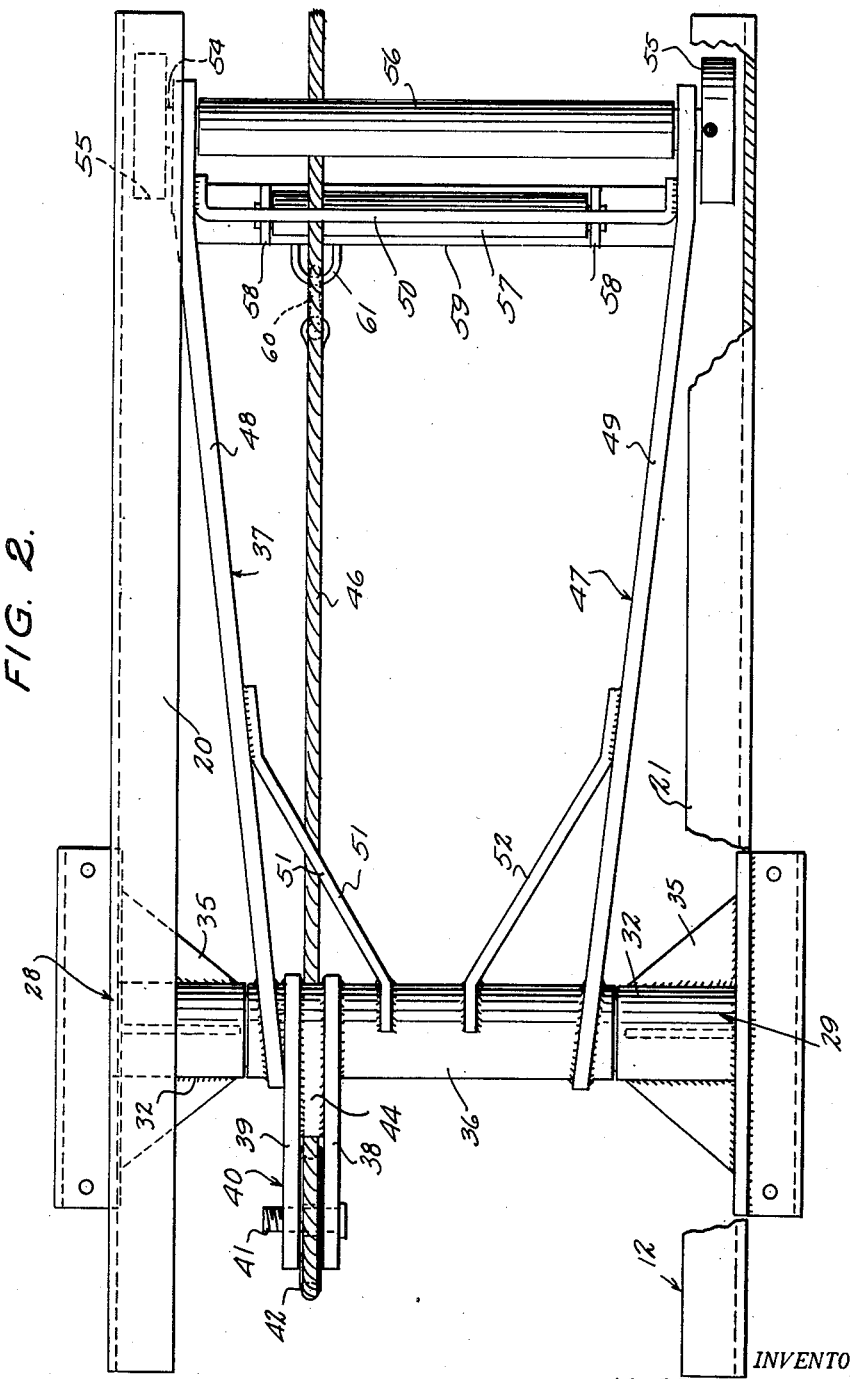

2,647,013

UNITED STATES PATENT OFFICE 2,647,013

WINCH-OPERATED HOIST TRUCK

Jasper C. Stuart and Gerard D. Darnell, Hoisington, Kans.; Lee Ona Stuart, administratrix of said Jasper C. Stuart, deceased Application April 5, 1949, Serial No. 85,624

3 Claims. (Cl. 298—21)

1

This invention relates to a winch-operated, underbody truck hoist, and more particularly to a hoist for the dumping type of farm truck and the like.

It is an object of this invention to provide a truck body hoist of the kind to be more particularly described hereinafter, having a winch for raising the body, the winch being disengageable from the body-raising mechanism for separate use as desired.

Another object of this invention is to provide a winch-operated truck hoist so arranged on a truck that it will not protrude above the bed, or below the working parts of the truck. The hoist will operate with either an underslung or top-mounted type winch.

Still another object of this invention is to provide a truck hoist of this kind having a minimum number of working parts, thereby obviating the excessive maintenance and upkeep, labor and expense.

Yet another object is to provide a truck hoist having a bell crank engaging the body so constructed and arranged as to provide a maximum raising effect to start the load and to follow through to a zero raising effect as the bed reaches its dumping angle. The maximum raising height is increased by an amount equal to the radius of the main rollers at the point of contact with the tracks fixed on the bed.

With the above and other objects in view, our invention consists in the arrangement, combination and details of construction disclosed in the drawings and specification, and then more particularly pointed out in the appended claims.

In the drawings:

Figure 1 is a side elevation of a farm truck having a winch-operated truck hoist constructed according to an embodiment of our invention;

Figure 2 is a fragmentary horizontal section taken on the line 2—2 of Figure 1;

Figure 3 is a fragmentary side elevation, partly broken away and partly in section, of the lift mechanism of the hoist;

Figure 4 is a transverse section taken on the line 4—4 of Figure 3.

Referring to the drawings, the numeral 10 designates generally a truck of more or less conventional configuration generally used in farm work, the truck 10 being of substantially one and one-half or two-ton capacity. The truck 10 is provided with a bed 11 pivotally mounted on the rear end of the frame 12 of the truck.

The truck bed 11 is formed with a base 14 on which a flat loading surface 15 is supported. The

2 base 14 is provided with a pair of downwardly-extending arms 16 on the rear end thereof for pivotally connecting the rear end of the bed 11 to the frame of the truck. The transversely-spaced-apart arms 16 are provided each with a series of openings 17 through a selected one of which a pivot pin, as 18, may be engaged. Rearwardly-extending lugs or bearing members 19 are fixed on the rear end of the truck frame 12 and extend rearwardly therefrom. The bearing members 19 are provided with a bearing on the rear end thereof through which the pivot pin 18 is adapted to be engaged.

A pair of track members 20 and 21 are fixed to or secured on the lower surface of the base 14 longitudinally thereof and being transversely spaced apart. The track members 20 and 21 provide bearing surfaces for the rollers of the hoist mechanism to be described hereinafter. The track members 20 and 21 are formed of angled metal material having a flat horizontal upper portion adapted to be secured to the bottom flat surface of the base 14, and a depending flange on the outer side thereof. The track members 20 and 21 are open on their confronting longitudinal edges between which the roller of the hoisting mechanism is adapted to be engaged, for free longitudinal movement along the length of the base 14 between the track members 20 and 21.

For raising the bed 11 about the pivot pin 18 thereof to dump or slide material therefrom, we have provided a winch-actuated hoist mechanism carried by the truck frame 12. The hoisting mechanism includes a power-operated hoist winch 24 having a winding drum 25 and is operatively connected with the driving motor of the truck 10. The winch 24 is supported on the frame 12 rearwardly of the cab 26 of the truck and may be supported above or below the longitudinal frame members of the frame 12 either in the underslung or top-mounted arrangement.

A shaft 27 is fixed between a pair of brackets 28 and 29 on the opposite sides of the frame 12. The brackets 28 and 29 each includes a vertically-extending web portion 30 which is adapted to be fixed to the frame 12 by welding, indicated by the numeral 31, or other suitable fastening means. The bracket web 30 extends upwardly over the upper edge of the longitudinal frame members of the frame 12 and a short sleeve section 32 is fixed on the upper end of the webs 30 extending inwardly of the frame. The sleeve sections 32 are open on their confronting ends to receive the shaft 27 therein. The shaft 27 is anchored within the brackets 28 by bolts 34 extending through the sleeve sections 32 and through the tubular shaft 27 mounted therein. Reinforcing webs 35 extend inwardly from the inner surface of the web 30 and engage the sleeve sections 32 for rigidly supporting the inwardly-extending ends of the sleeve sections.

A bearing member or sleeve 36 is rotatably mounted on the shaft 27 between the sleeve sections 32. The opposite ends of the sleeve 36 or bearing engage the confronting ends of the sleeve sections 32 for limiting the transverse movement of the bearing 36.

A generally L-shaped lever or bell crank 37 is fixed on the sleeve 36 and is adapted to engage the bed 11 for raising the bed about the pivot 18. The L-shaped lever or bell crank 37 includes a horizontal forwardly extending arm 48 which has its rear end fixed on the sleeve 36 and a pair of downwardly-extending lever arms 38 and 39 which are fixed on the bearing member or sleeve 36 and normally extend downwardly and rearwardly therefrom, in the lowered position of the bed 11. The lever arms 38 and 39 are transversely spaced apart on the sleeve 36 and together form a unitary lever arm 40 of the bell crank 37. A pivot pin 41 engages between the arms 38 and 39 at the lower end thereof, and a pulley 42 is rotatably mounted on the pin 41. Suitable longitudinal reinforcing webs, as 44 and 45, are fixed between the arms 38 and 39 along the length thereof inwardly of the pulley 42. The reinforcing webs 44 and 45 are terminated in spaced relation to the pulley 42 to provide a sufficient space between the arms 38 and 39 for the free passage of the cable 46 which engages about the pulley.

A second generally L-shaped lever or bell crank 47 arranged in parallel spaced longitudinal relation with respect to the lever or bell crank 37 is likewise fixed on the sleeve 36, the bell crank 47 including a horizontal forwardly extending arm 49 which has its rear end fixedly secured to the sleeve 36. In normal operation, the arm 48 of the bell crank 37 and the arm 49 of the bell crank 47 extend forwardly in slight divergent relation relative to each other. A transverse bar 50 is fixed between the arms 48 and 49 at their forward divergent ends for rigidly securing the arms together. Lower bracing members 51 and 52 are fixed between the bearing member 36 and the arms 48 and 49, respectively, intermediate the length thereof. A shaft 54 is carried by the extreme forward end of the lever arm 47, and a roller 55 is rotatably supported on the ends of the shaft 54, outwardly of the arms 48 and 49. The rollers 55 are adapted to roll on the flat surface of the track members 20 and 21 which are fixed on the bottom of the bed 11. A roller 56 is rotatable on the shaft 54 between the arms 48 and 49 to provide for the free movement of the flexible member 46 while the bed 11 is in its lowered position.

A guide roller 57 is rotatably mounted on a pair of upstanding bearings 58 which are fixed on a transverse frame member 59 rearwardly of the winch 24 and forwardly of the rear end of the frame 12. The roller 57 provides a bearing surface for the cable 46 during the raising and lowering of the bed 11.

In the use and operation of the winch-operated truck hoist of this invention, the flexible cable 46, which is wound at one end about the drum 25 of the winch 24, is trained rearwardly over the roller 57 which is rotatably supported on the frame 12. With the bed 11 in its lowered position, the cable 46 will engage the lower surface portion of roller 56 which is carried by the forwardly-extending lever arm 47. The cable 46 is trained over the pulley 42 and again forwardly where it is adapted to be fixed on the frame. A hook 60 is carried by the free end of the cable 46 and is adapted to engage an eye 61 which is fixed on the transverse frame member 59. Upon winding of the drum 25 for raising the bed 11, the downwardly and rearwardly-extending lever arm 40 will be rocked forwardly about the shaft 27 to a substantially horizontal position, as noted in dotted lines in Figure 1 of the drawings. The normally horizontal arm 47 will be rocked to an upwardly and rearwardly-extending position, as noted in Figure 1. As the arm 47 is moved upwardly, the rollers 55 will roll along the length of the tracks 20 and 21. In the raised position of the bell crank 37, the upper arm 47 will be disposed substantially perpendicular to the plane of the bottom surface of the bed 11, but the hoist depends upon the weight of the bed 11 for lowering and for moving the bell crank 37 to its lowered position.

Upon unwinding of the drum 25 for lowering the bed 11 to its normal horizontal position, the rollers 55 will be disposed forwardly of the transverse frame member 59 and the transverse bar 50 of the bell crank 37 will engage on the upper edge of the bearing members 58, or other suitable stop means carried by the frame for limiting the downward swinging movement of the arm 47.

As the truck 10 is principally designed for farm use, where the equipment is most advantageously applied to more than one use, the hook 60 may be disengaged from the eye 61 so that the winch and cable 46 may be used for other purposes, other than for the lifting of the bed 11. With the hook 60 removed from the eye 61, the cable 46 may be removed from the pulley 42, and from its engagement over the roller 57 and under the roller 56, so that the hook and cable together with the winding drum 25 may be applied to purposes other than the raising and lowering of the bed 11.

We do not mean to confine ourselves to the exact details of construction herein disclosed, but claim all variations falling within the purview of the appended claims.

We claim:

1. In a truck having a wheeled frame, a horizontally disposed dump bed arranged in longitudinal superimposed spaced relation with respect to said frame and having one end connected to said frame for movement from its horizontal position to an upstanding position, a pair of track members arranged longitudinally of and below said dump bed and dependingly carried by the latter, a shaft arranged transversely of and below said track members intermediate the ends of the latter and fixedly secured to said frame, a sleeve mounted on said shaft for rotation about the latter, a pair of horizontally disposed arms arranged in longitudinal spaced relation positioned intermediate and below said track members and having one end fixedly secured to said sleeve, a pair of spaced rotatable rollers carried by the other end of said arms and rollably engageable with said track members, a rotatable pulley positioned below and spaced from said sleeve and dependingly supported from the latter, a rotatable drum positioned below said bed adjacent the other end of the latter and carried by said frame, a guide roller arranged between and in parallel spaced relation with respect to said pulley and drum and supported by said frame, and a flexible member wound about said drum and trained over said pulley and guide roller and having one end fixedly secured to said frame.

2. In a truck having a wheeled frame, a horizontally disposed dump bed arranged in longitudinal superimposed spaced relation with respect to said frame and having one end connected to said frame for movement from its horizontal position to an upstanding position, a pair of track members arranged longitudinally of and below said dump bed and dependingly carried by the latter, a shaft arranged transversely of and below said track members intermediate the ends of the latter and fixedly secured to said frame, a sleeve mounted on said shaft for rotation about the latter, a pair of horizontally disposed arms arranged in longitudinal spaced relation positioned intermediate and below said track members and having one end fixedly secured to said sleeve, a pair of spaced rotatable rollers carried by the other end of said arms and rollably engageable with said track members, a second pair of upstanding arms arranged in longitudinal spaced relation positioned adjacent said sleeve and having the upper ends fixedly secured to said sleeve, a pulley positioned between said second pair of arms adjacent the lower ends of the latter and rotatably supported in the latter named arms, a rotatable drum positioned below said bed adjacent the other end of the latter and carried by said frame, a guide roller arranged between and in parallel spaced relation with respect to said pulley and drum and supported by said frame, and a flexible member wound about said drum and trained over said pulley and guide roller and having one end fixedly secured to said frame.

3. In a truck having a wheeled frame, a pair of horizontally disposed lugs projecting from the rear end of said frame, a horizontally disposed dump bed arranged in longitudinal superimposed spaced relation with respect to said frame, a pair of vertically disposed arms dependingly carried by said dump bed adjacent one end thereof and engaging said lugs, a pin extending through said pair of lugs and arms and connecting said dump bed to said frame for pivotal movement from its horizontal position to an upstanding position, a pair of track members arranged longitudinally of and below said dump bed and dependingly carried by the latter, a shaft arranged transversely of and below said track members intermediate the ends of the latter and fixedly secured to said frame, a sleeve mounted on said shaft for rotation about the latter, a pair of horizontally disposed arms arranged in longitudinal spaced relation positioned intermediate and below said track members and having one end fixedly secured to said sleeve, a second shaft arranged transversely of said arms adjacent the other ends thereof and fixedly secured to said arms, a rotatable roller on each of the ends of said second named shaft and rollably engageable with the adjacent track member, a second pair of upstanding arms arranged in longitudinal spaced relation positioned adjacent said sleeve and having the upper ends fixedly secured to said sleeve, a pulley positioned between said second pair of arms adjacent the lower ends of the latter and rotatably supported in the latter named arms, a rotatable drum positioned below said bed adjacent the upper end of the latter and carrier by said frame, a guide roller arranged between and in parallel spaced relation with respect to said pulley and drum and supported by said frame, and a flexible member wound about said drum and trained over said pulley and guide roller and having one end fixedly secured to said frame.

JASPER C. STUART.
GERARD D. DARNELL.

References Cited in the file of this patent

UNITED STATES PATENTS

| Number | Name | Date |
|---|---|---|
| 1,018,119 | Lally | Feb. 20, 1912 |
| 1,566,031 | Marks | Dec. 15, 1925 |
| 1,355,576 | Senderling | Oct. 12, 1920 |
| 1,455,528 | Hansen | May 15, 1923 |
| 1,636,555 | Eugler | July 19, 1927 |
| 2,425,953 | Rogers | Aug. 19, 1947 |
| 2,482,406 | Findley | Sept. 20, 1949 |
| 2,549,900 | Frenzel | Apr. 24, 1951 |

FOREIGN PATENTS

| Number | Country | Date |
|---|---|---|
| 172,175 | Great Britain | Dec. 8, 1921 |
| 344,310 | Great Britain | of 1931 |